United States Patent
Klein et al.

(10) Patent No.: US 7,435,758 B2
(45) Date of Patent: *Oct. 14, 2008

(54) ADDITIVE FOR PRODUCING THE POSITIVE ACTIVE MATERIAL FOR LEAD-ACID STORAGE BATTERIES, A METHOD FOR ITS PRODUCTION, AND ITS USE

(75) Inventors: Ian Klein, Bad Harzburg (DE); Werner Nitsche, Lippstadt (DE)

(73) Assignee: Penarroya Oxide GmbH, Cologne (DE)

( * ) Notice: Subject to any disclaimer, the term of this patent is extended or adjusted under 35 U.S.C. 154(b) by 770 days.

This patent is subject to a terminal disclaimer.

(21) Appl. No.: 10/746,885

(22) Filed: Dec. 23, 2003

(65) Prior Publication Data
US 2004/0234852 A1 Nov. 25, 2004

Related U.S. Application Data

(63) Continuation-in-part of application No. 10/406,481, filed on Apr. 3, 2003, now Pat. No. 7,091,250.

(30) Foreign Application Priority Data

Dec. 24, 2002 (DE) .................... 102 61 049
Mar. 6, 2003 (DE) .................... 103 09 842

(51) Int. Cl.
C09K 3/00 (2006.01)
H01M 4/82 (2006.01)
B01F 3/12 (2006.01)

(52) U.S. Cl. ............ 516/88; 252/182.11; 423/266; 423/267; 423/559; 428/404; 29/2; 29/623.1

(58) Field of Classification Search ........... 516/88, 516/92; 252/182.11; 423/266, 267, 559; 428/404
See application file for complete search history.

(56) References Cited

U.S. PATENT DOCUMENTS

| | | | | |
|---|---|---|---|---|
| 1,595,052 A | * | 8/1926 | Acheson | 516/92 |
| 7,091,250 B2 | * | 8/2006 | Klein et al. | 516/88 |
| 2003/0175203 A1 | | 9/2003 | Nitsche et al. | |

FOREIGN PATENT DOCUMENTS

| | | |
|---|---|---|
| DE | 3 532 697 A | 4/1987 |
| EP | 1235287 A1 | 8/2002 |
| GB | 1396308 | 6/1975 |

OTHER PUBLICATIONS

German Search Report, dated May 23, 2003, for corresponding application DE 102 61 049.5.

* cited by examiner

Primary Examiner—Daniel S Metzmaier
(74) Attorney, Agent, or Firm—Alston & Bird LLP

(57) ABSTRACT

Described is an additive for producing the positive active material for lead-acid storage batteries on the basis of finely divided tetrabasic lead sulfate. The additive contains a tetrabasic lead sulfate of an average particle size smaller than about 3 μm as well as finely divided silicic acid for preventing an agglomeration of the particles of the tetrabasic lead sulfate. During maturation, this additive ensures the formation of the structure of a tetrabasic lead sulfate crystal with a very narrow bandwidth of crystal sizes and a very homogeneous distribution. In a subsequent electrochemical formation to lead oxide, this leads to particularly efficient lead-acid storage batteries. Furthermore, the invention relates to a method of making the additive according to the invention as well as its advantageous use in the positive material for the maturation and drying of singled and not singled plates in the production of lead-acid storage batteries.

41 Claims, No Drawings

ADDITIVE FOR PRODUCING THE POSITIVE ACTIVE MATERIAL FOR LEAD-ACID STORAGE BATTERIES, A METHOD FOR ITS PRODUCTION, AND ITS USE

This is a continuation-in-part application of 10/406,481, filed Apr. 3, 2003, now U.S. Pat. No. 7,091,250, which is incorporated herein by reference in its entirety, and also claims the benefit of German Priority Application Nos. 103 09 842.9 filed Mar. 6, 2003 and 102 61 049.5 filed Dec. 24, 2002.

FIELD OF THE INVENTION

The invention relates to an additive for producing the positive active material for lead-acid storage batteries on the basis of finely divided tetrabasic lead sulfate, a method for producing this additive, as well as the use of the additive for the described purpose.

BACKGROUND OF THE INVENTION

In the production of lead-acid storage batteries of the art, the positive plates are matured and dried in batches or continuously in so-called maturing and drying chambers after pasting the grids with the positive active material. From the main ingredients in the form of lead oxide, water, and lead sulfate, tribasic ($3PbO \cdot PbSO_4$) and/or tetrabasic ($3PbO \cdot PbSO_4$) lead sulfates are formed by maturation. Predominantly, the plates are laid in stacks on pallets without being separated. They are less often placed upright on pallets without separation, or hung with external lugs loosely in frames as occurs in the special case of double grids.

For the maturing to a tribasic lead sulfate with crystal sizes <10 μm, it is common practice to mature and subsequently dry the plates at about 55° C. over a period of time from 12 to 24 hours. Depending on the type of oxide that is used, as well as the desired residual moisture, drying will take as long as a few days.

As a function of the chemical and physical conditions, a phase transition from the formation of tribasic to the formation of tetrabasic lead sulfate occurs in the temperature range from 60° to 70° C. For maturing to a tetrabasic lead sulfate, it is common practice to mature the plates in water vapor for a few hours at a temperature of normally >80° C., and to dry them thereafter in the same way as the plates that are matured to tribasic form. A great disadvantage in the case of such a maturing by the action of water vapor is the development of coarse-crystalline tetrabasic lead sulfate crystals. In this instance, there may be crystal sizes >50μm.

During the subsequent formation, the matured active material of the positive plates is electrochemically converted to lead dioxide. Along with the increasing crystal size, the conversion of the basic lead sulfates becomes costlier and lengthier. The required amount of electric energy for converting a coarse-crystalline structure is by more than 25% higher than that of a fine-crystalline structure. In this instance, a "fine-crystalline" structure is understood a material of a crystal size <10 μm. In the case of a coarse-crystalline structure, crystals >30 μm are present. For a complete formation, it is moreover necessary to include residence times. By applying larger amounts of energy and the necessity of residence times that are to be included, the formation of coarse-crystalline, tetrabasic lead sulfate will as a rule take a substantially longer time.

The maturing into tetrabasic lead sulfates is advantageous in the case of lead-acid storage batteries with antimony-free alloys for the positive grids. Lead-acid storage batteries with antimony-free alloys for the positive grids and positive active materials that are matured into tetrabasic form, exhibit a stable capacity during a cyclical load, and they have a clearly longer service life. Lead-acid storage batteries with antimony-containing alloys of the positive grids are increasingly replaced with antimony-free grids, since these lead-acid storage batteries have moreover a longer shelf life as well as a visibly smaller water consumption.

For this reason, there exists a great interest in methods and possibilities of maturing positive plates into a small-crystalline tetrabasic lead sulfate. In the art, two methods stand out:

According to a common production practice, the plates are first matured to become tribasic and dried to advantageously less than 0.5 wt. % residual moisture. Subsequently, a water vapor treatment occurs over several hours at temperatures of normally >80° C. During this phase, the tribasic lead sulfate is converted into tetrabasic lead sulfate. In this process the crystal size remains almost unchanged, provided the moisture does not exceed about 2 wt % during the water vapor treatment of the plates. In the case of too moist plates, a growth to coarse-crystalline tetrabasic lead sulfate will occur. In the case of a properly conducted process, plates with small-crystalline tetrabasic lead sulfate are present after a subsequent, renewed drying process. A great disadvantage of this method lies in the long process time. Moreover, the paste-grid bonding is inferior to the positive plates that are matured in water vapor directly to coarse-crystalline tetrabasic lead sulfate. The size of the crystals of the tetrabasic lead sulfate cannot be controlled, and is <3 μm. In the case of a cyclic total discharge of wet lead acid storage batteries, this may lead to irreparable damage of the positive electrodes and, thus, to a shortening of the usable life of the lead-acid storage batteries.

In a second known method, previously finely ground tetrabasic lead sulfate is added to the active positive material during the production process. The maturation occurs in the same manner as in the case of the described maturation into coarse-crystalline tetrabasic lead sulfate by the action of water vapor and preferably at temperatures above 80° C. The added, finely ground tetrabasic lead sulfate crystals having a diameter <1 μm act as nucleators and allow individual plates a controlled crystal growth to a fine-crystalline tetrabasic crystal structure. Preferably, this method is carried out continuously.

The disadvantage of this method is the necessity of separating the plates, for example, by hanging double plates in spaced relationship or by a climatic diaphragm between individual plates. It is currently common practice in the production of plates for lead-acid storage batteries to stack them, after pasting, without spacers, and to mature them while being stacked. The necessity of singling the plates thus represents a considerable extra expenditure. As a result, it is not possible to use present systems and techniques for the plate production without new, additional devices or considerable modifications. The separation of the plates by spaces therebetween or climatic diaphragms leads to the need of more floor space, thereby reducing the capacity of plates in existing maturing and drying chambers to a great extent.

SUMMARY OF THE INVENTION

It is an object of the invention to eliminate the problems shown with reference to the art, in particular to present a technical proposal that shows, how it is possible to mature plates in stacks to fine-crystalline tetrabasic lead sulfate.

In accordance with the invention, this object is accomplished by an additive for producing the positive active material for lead-acid storage batteries on the basis of finely divided tetrabasic lead sulfate, which is characterized in that it contains a tetra-basic lead sulfate of an average particle size of less than about 3 μm and finely divided silicic acid for preventing an agglomeration of the particles of the tetrabasic lead sulfate.

The use of the additive in accordance with the invention has shown that it will be possible to realize especially satisfactory effects and advantages, when the average particle size of the tetrabasic lead sulfate is in particular less than about 1.5 μm. The range from about 0.2 to 0.9 μm turns out to be especially advantageous. Going below the value of 0.2 μm would economically bring no advantage. An increasing average particle size will make it necessary to increase the quantity of the additive, so that likewise in this instance, an exceeding of the upper value should be avoided for economic reasons.

It is preferred to avoid a too fine particle size of the silicic acid. In this connection, it has been found that commercially available finely divided silicic acids will be of special advantage, when their specific surface according to BET is less than 300 m$^2$/g, in particular less than 150 m$^2$/g. The commercially available finely divided silicic acids are normally classified by indicating the specific surface in the type designation. This makes it possible to correlate primarily the data concerning the specific surface of the finely divided silicic acid with the corresponding particle sizes in the alkaline range, which is present in the production of the active materials.

With this kind of an approach, the average particle size of the finely divided silicic acids suitably ranges from about 10 to 120 nm, in particular from about 20 to 80 nm, with the range from about 40 to 60 nm being especially advantageous. If the value falls below about 10 nm, the desired action of preventing the particles of the tetrabasic lead sulfate from agglomerating will not occur. In individual cases, it would basically be possible to also exceed the value of 120 nm, although the desired effects are best seen within the foregoing range from about 40 to 60 nm.

If the particles are too small, they will result in that a wide grain distribution of tetrabasic lead sulfate crystals of different sizes occurs during maturation. With the use of such silicic acids, it is not possible to prevent tetrabasic lead sulfate crystals with a particle size greater than 10 μm. They will appear in part individually distributed, in part in clusters, and they may reach crystal sizes as are normally found in matured coarse-crystalline plates. Within the foregoing range of the particle size in particular from 20 to 80 nm, and quite particularly from 40 to 60 nm, the agglomeration of the finely ground tetrabasic seed crystals is prevented. Moreover, it is ensured that very homogeneous, fine-crystalline tetrabasic lead sulfate crystal structures develop during the maturation. The end size of the tetrabasic lead sulfate crystals is controlled by the quantity of the added microsulfate. For economic reasons, it has been found advantageous for lead-acid storage batteries with free sulfuric acid as electrolytes to determine the quantity such that a fine-crystalline tetrabasic crystal structure is obtained with crystal sizes of a bandwidth from about 5 to 10 μm. Such a distribution will need a simple formation. In the case of sealed lead-acid storage batteries with electrolytes localized in gels or microporous glass fiber mats, a shift toward smaller crystal sizes while increasing the quantity of microsulfate can be advantageous. When adding about 0.5 to 3.0 wt % of the suspension according to the invention, it is possible to control as guide values the crystal sizes of the tetrabasic lead sulfate in the range from about 2 to 10 μm after the maturing of the active substance. For economic reasons, it is suggested that the quantity of the suspension be determined such that one obtains for (a) so-called wet lead acid storage batteries, crystal sizes from about 5 to 10 μm by adding about 0.5 to 2% suspension, and for (b) sealed storage batteries, from about 2 to 5 μm by adding about 2 to 3 wt %. Accordingly, the desired effect is controlled by the quantity of added microsulfate and not by process parameters of a normal proceeding (temperature, moisture, and time).

Within the scope of the invention, the skilled person is not subjected to any significant limitation with respect to the selection of the finely divided silicic acid. However, it is preferred to use pyrogenic silicic acids, i.e., "hydrophobic" and/or "hydrophilic" qualities.

As regards a quantity ratio of basic lead sulfate to finely divided silicic acid in the additive of the invention, there exists no critical limitation. Naturally, it is necessary to select the percentage of finely divided silicic acid high, so that the desirable effect of preventing the particles of the tetrabasic lead sulfate from agglomerating occurs to a desired extent. Suitably, the composition of the additive according to the invention is adjusted such that, when related to the total weight of tetrabasic lead sulfate and finely divided silicic acid, finely divided silicic acid is present from about 0.01 to 10 wt %, in particular about 0.02 to 5 wt. %. In a very particular manner, the range is selected from about 0.05 to 0.5 wt. %. Below the value of 0.05 wt. % of finely divided silicic acid, the agglomeration is no longer prevented to an adequate extent. At a value of more than 10 wt. %, this desired effect does no longer increase.

According to the method of the present invention, which is described further below, the additive is obtained in the form of an aqueous suspension. The latter is also preferred in the case of possible uses as are described further below. It is likewise possible to dry the obtained aqueous suspensions to a powder, which is produced preferably by spray drying the aqueous suspension. It has turned out advantageously that the aforesaid aqueous suspension, which is added to the intended use without drying, has a solids content from about 10 to 70 wt. %, in particular from about 20 to 50 wt. %. If the aforesaid highest value of 70 wt. % is exceeded, a homogeneous incorporation into the positive active material will become complicated or impossible. However, the evenness or homogeneity of the finished, positive active material is necessary to achieve by maturing a homogeneous grain size distribution of a narrow bandwidth. Hypothetically, the lower limitation of the solids content of the aqueous suspension in accordance with the invention is limited as regards the water content, only by the formulation of the paste.

Furthermore, it is an object of the invention to provide a method of producing the additive according to the invention, as has been described above. This method is characterized in that tetrabasic lead sulfate is wet ground in an aqueous medium down to a particle size of less than about 3 μm, with a finely divided silicic acid of the above-described type being added to the ground or to-be-ground tetrabasic lead sulfate. Preferably, the wet grinding occurs in agitating ball mills, in particular in closed agitating ball mills. The closed agitating ball mills have the advantage that the grinding energy is applied in an optimized way.

DETAILED DESCRIPTION OF THE PREFERRED EMBODIMENTS

In the following, the method of the invention as well as the advantageous uses of the additive according to the invention are described in greater detail, also with respect to achievable advantages:

According to the invention, a suspension, hereafter "microsulfate" is produced by grinding tetrabasic lead sulfate in an aqueous medium, while adding special, finely divided silicic acid. A commercially available tetrabasic lead sulfate or a tetrabasic lead sulfate obtained from plates matured into tetrabasic form, is ground as basic substance in a wet grinding process, for example, with agitating ball mills, in particular of the closed type, preferably to an average crystal size of less than 1 µm. An essential point in this process is that the parameters as addressed with respect to the "silicic acid" be maintained. Thus, the silicic acid must be finely divided. Preferably, it has a hydrophobic character. Preferred in this connection is the aforesaid pyrogenic silicic acid. This pyrogenic silicic acid has the special advantage that it exhibits a desirable purity, so that no foreign substances interfere with the operation of the lead-acid storage battery. In this connection, it is advantageous to add the finely divided silicic acid already during the preparation to the tetrabasic lead sulfate that is to be ground. While a subsequent dosage in a suitable metering system is also possible, it leads to an additional economic expenditure and a prolongation of the entire process time.

In the production of lead-acid storage batteries, it is technically advantageous to use as addition to the mixing process of the active positive materials, suspensions that are produced during the wet grinding process. Thus, it is easily possible to add the suspension to the mixing process by means of a simple metering device. It is possible and useful in special applications to dry and produce a powder from the suspension, in particular within the scope of spray drying. Due to the additional expenditure and observation of workmen's protection rules, the production of a powder as compared with the use of an aqueous suspension is in general not to be recommended in view of possible dust exposures.

The concept of the invention as described above is also well consistent with the more extensive teaching of the invention, wherein the finely divided silicic acid is used in particular in a hydrophobic and/or a hydrophilic form, in particular in a pyrogenic form in combination with a finely divided tetrabasic lead sulfate having an average particle size smaller than about 3 µm, and wherein these two components are added to a positive, active material for lead-acid storage batteries. In this process, it is preferred to add these two components one after the other to the positive active material for lead-acid storage batteries. In particular, it is preferred to add to the positive material, first the finely divided tetrabasic lead sulfate and then the finely-divided silicic acid. This kind of procedure normally requires an increased addition of finely-divided silicic acid.

After adding the suspension obtained in accordance with the invention to the positive active material during the mixing process, in particular fine-crystalline tetrabasic lead sulfate develops during the subsequent maturation in the case of the below-described embodiments. This results in the advantage that existing production lines can be advantageously used without modifications with the use of the additive according to the invention. In this connection, it is preferred to use the above-described additive in the positive active material for the maturing and drying of singled and not singled plates in the production of lead-acid storage batteries. In a particularly advantageous manner, maturing of the plates in stacks, lying, standing, or hanging, occurs within approximately one hour by the action of vapor, at a temperature higher than about 60° C., in particular at a temperature from about 80 to 95° C. It is also possible to obtain good results, when the plates undergo maturing in stacks, lying, standing, or hanging in batch chambers or by the action of vapor at temperatures below about 60° C. and within 12 to 24 hours.

However, the plates can also be matured in a continuous maturing and drying process. Especially good results will be achieved, when the plates are matured in stacks, lying, standing, or hanging, in a continuous maturing and drying process by the action of vapor within approximately one hour at about 80 to 95° C. In the described continuous maturing and drying process, it is highly preferred that maturing and drying occur in a multistage drying process at rising temperatures. In this connection, it has been found especially advantageous that drying at rising temperatures starts at about 50° C., and continues to as high as about 90° C. during approximately 1 to 4 hours, in particular during about 2 to 3 hours.

The excellent dispersibility of the tetrabasic seed crystals in the positive active material by the finely divided silicic acids leads during the maturation to a tetrabasic crystal structure that is characterized by a particularly narrow bandwidth of crystal sizes, and which is very homogeneously composed. This applies to plates that are both stacked and separated during maturation. As a result of the narrow bandwidth of tetrabasic crystal sizes a greater surface is achieved with the same pore volume, or said otherwise, a larger pore volume with the same surface of the tetrabasic crystals. The advantage lies in an increase in the quantity of sulfuric acid that is received in the free pores of the plate. This allows improving the electric power data. For the user of microsulfate, this results as an economic advantage, in the possibility of saving active positive material with unchanged electric power data of the lead-acid storage batteries.

The use of the teaching according to the invention covers the entire spectrum of current systems engineering and common process sequences. Current pasting lines with downstream stacking systems, as well as all common maturing and drying chambers are usable without modification. Moreover, it is possible to present in future a continuous maturing and drying technique in a total period of time from about 3 to 4 hours. In all addressed applications, the end product is formed by fine-crystalline tetrabasic lead sulfates with crystal sizes <10 µm. The thus-produced plates are also as easy to form as are those produced from tribasic lead sulfates.

The invention claimed is:

1. An additive for producing a positive active material for a lead-acid storage battery, comprising:
   tetrabasic lead sulfate particles having an average particle size of less than about 3 µm; and
   finely divided silicic acid for preventing agglomeration of the tetrabasic lead sulfate particles.

2. The additive of claim 1, wherein the finely-divided silicic acid is hydrophilic.

3. The additive of claim 1, wherein the finely-divided silicic acid is pyrogenic.

4. The additive of claim 1, wherein the average particle size of the tetrabasic lead sulfate particles is less than about 1.5 µm.

5. The additive of claim 1, wherein the average particle size of the tetrabasic lead sulfate particles is from about 0.2 to about 0.9 µm.

6. The additive of claim 1, wherein the finely divided silicic acid has an average particle size from about 10 to about 120 nm.

7. The additive of claim 1, wherein the finely divided silicic acid has an average particle size from about 20 to about 80 nm.

8. The additive of claim 1, wherein the finely divided silicic acid has an average particle size from about 40 to about 60 nm.

9. The additive of claim 1, wherein the finely-divided silicic acid has a specific surface area according to BET of less than about 300 m$^2$/g.

10. The additive of claim 1, wherein the finely-divided silicic acid has a specific surface area according to BET of less than about 150 m$^2$/g.

11. The additive of claim 1, wherein the finely divided silicic acid is present in an amount from about 0.01 to about 10 wt. %, based on the total weight of tetrabasic lead sulfate and finely divided silicic acid.

12. The additive of claim 1, wherein the finely divided silicic acid is present in an amount from about 0.05 to about 5 wt. %, based on the total weight of tetrabasic lead sulfate and finely divided silicic acid.

13. The additive of claim 1, wherein the additive is in the form of an aqueous suspension.

14. The additive of claim 13, wherein the aqueous suspension has a solids content from about 10 to about 70 wt. %.

15. The additive of claim 13, wherein the aqueous suspension has a solids content from about 20 to about 50 wt. %.

16. The additive of claim 1, wherein the additive is in the form of a powder.

17. A positive active material for a lead-acid storage battery, comprising the additive of claim 1.

18. A method of producing an additive for a positive active material for a lead-acid storage battery, comprising the steps of:
    wet grinding tetrabasic lead sulfate particles to a particle size of less than about 3 µm; and
    adding a finely divided silicic acid to the tetrabasic lead sulfate particles.

19. The method of claim 18, wherein the finely divided silicic acid is hydrophobic.

20. The method of claim 18, wherein the finely divided silicic acid is hydrophilic.

21. The method of claim 18, wherein the finely divided silicic acid is pyrogenic.

22. The method of claim 18, wherein the finely divided silicic acid is added to the tetrabasic lead sulfate prior to said wet grinding step.

23. The method of claim 18, wherein the finely divided silicic acid is added to the tetrabasic lead sulfate after said wet grinding step.

24. The method of claim 18, wherein the tetrabasic lead sulfate is wet ground in agitating ball mills.

25. The method of claim 24, wherein the tetrabasic lead sulfate is wet ground in closed agitating ball mills.

26. The method of claim 18, further comprising the step of drying the product of the wet grinding step to produce a powder.

27. The method of claim 26, wherein said drying step comprises spray drying the product of the wet grinding step.

28. A method for producing plates for lead-acid storage batteries, comprising the steps of:
    producing a positive active material including an additive comprising tetrabasic lead sulfate particles of an average particle size of less than about 3 µm and finely divided silicic acid for preventing agglomeration of the tetrabasic lead sulfate particles;
    forming plates including the positive active material; and
    drying and maturing the plates for use in a lead-acid storage battery.

29. The method of claim 28, wherein the finely divided silicic acid is hydrophobic.

30. The method of claim 28, wherein the finely divided silicic acid is hydrophilic.

31. The method of claim 28, wherein said drying and maturing step comprises maturing the plates in stacks through the use of water vapor at a temperature of more than about 60° C. within about one hour.

32. The method of claim 31, wherein said drying and maturing step comprises maturing the plates in stacks through the use of water vapor at a temperature from about 80 to about 95° C. within about one hour.

33. The method of claim 28, wherein the maturing and drying step is continuous.

34. The method of claim 28, wherein said drying and maturing step comprises maturing the plates in stacks through the use of water vapor at a temperature of below about 60° C. within 12 to 24 hours.

35. The method of claim 28, wherein said maturing step comprises maturing the plates either lying, standing or hanging in stacks.

36. The method of claim 28, wherein said maturing step comprises maturing the plates in batch chambers.

37. The method of claim 28, wherein said drying and maturing step comprises drying the plates in stacks in a continuous process using multistage drying with increasing temperatures.

38. The method of claim 27, wherein said drying step comprises drying the plates with increasing temperatures staffing at about 50° C. and increasing to about 90° C. over about 1 to about 4 hours.

39. The method of claim 38, wherein said drying step comprises drying the plates with increasing temperatures staffing at about 50° C. and increasing to about 90° C. over about 2 to about 3 hours.

40. The method of claim 37, wherein said drying step comprises drying the plates either lying, standing or hanging in stacks.

41. The method of claim 28, wherein the producing step comprises producing a positive active material including the additive, lead oxide, lead sulfate and water.

* * * * *

UNITED STATES PATENT AND TRADEMARK OFFICE
CERTIFICATE OF CORRECTION

PATENT NO. : 7,435,758 B2 Page 1 of 1
APPLICATION NO. : 10/746885
DATED : October 14, 2008
INVENTOR(S) : Klein et al.

It is certified that error appears in the above-identified patent and that said Letters Patent is hereby corrected as shown below:

<u>Column 8,</u>

Line 40, "staffing" should read --starting--.

Signed and Sealed this

Seventeenth Day of February, 2009

JOHN DOLL
*Acting Director of the United States Patent and Trademark Office*